(12) United States Patent
Marnell et al.

(10) Patent No.: US 9,672,334 B1
(45) Date of Patent: Jun. 6, 2017

(54) LICENSE ENTITLEMENT ASSIGNMENT AMBIGUITY RESOLUTION

(71) Applicant: FLEXERA SOFTWARE LLC, Itasca, IL (US)

(72) Inventors: Matthew Marnell, Boulder, CO (US); Vincent Brasseur, San Jose, CA (US); Paul Gerard Hughes, Box Hill (AU)

(73) Assignee: Flexera Software LLC, Itasca, IL (US)

( * ) Notice: Subject to any disclaimer, the term of this patent is extended or adjusted under 35 U.S.C. 154(b) by 0 days.

(21) Appl. No.: 15/138,189

(22) Filed: Apr. 25, 2016

(51) Int. Cl.
  *G06F 21/00* (2013.01)
  *G06F 21/10* (2013.01)
  *G06F 21/62* (2013.01)
  *G06F 17/30* (2006.01)

(52) U.S. Cl.
  CPC ........ *G06F 21/105* (2013.01); *G06F 17/3053* (2013.01); *G06F 21/6218* (2013.01)

(58) Field of Classification Search
  CPC .................................................... G06F 21/105
  USPC .......................................................... 705/59
  See application file for complete search history.

(56) References Cited

U.S. PATENT DOCUMENTS

| | | | | |
|---|---|---|---|---|
| 9,311,139 B1* | 4/2016 | Lowery | ................ | G06F 9/4843 |
| 2006/0015466 A1* | 1/2006 | Noioso | .................... | G06F 21/10 |
| | | | | 705/59 |
| 2008/0306786 A1* | 12/2008 | Lonowski | ............ | G06Q 10/063 |
| | | | | 705/7.11 |
| 2012/0130911 A1* | 5/2012 | Maclellan | .............. | G06Q 10/06 |
| | | | | 705/310 |
| 2013/0054492 A1* | 2/2013 | Boudreau | ............ | G06Q 10/063 |
| | | | | 705/400 |
| 2015/0186507 A1* | 7/2015 | Pawar | ............... | G06F 17/30731 |
| | | | | 707/739 |

\* cited by examiner

*Primary Examiner* — Christopher Brown
(74) *Attorney, Agent, or Firm* — Perkins Coie LLP

(57) ABSTRACT

Various embodiments include a resource control system. The resource control system can receive consumption demand requests to access one or more electronic resources. The resource control system can assign license entitlements, each with varying quantity, to consumption demand requests to enable access to the electronic resources. An ambiguity resolution engine can make license entitlement assignments to consumption demand requests when a set of license entitlements can cover a target electronic resource specified by the consumption demand requests. The ambiguity resolution engine can rank license entitlements based on ratios of their resource costs and the consumption demand requests based on their electronic resource usage efficiency. The ambiguity resolution engine can assign the license entitlements by comparing the rankings of the license entitlements and the rankings of the consumption demand requests.

18 Claims, 9 Drawing Sheets

| Feature | "Type One" License Entitlement | "Type Two" License Entitlement |
|---|---|---|
| License Model | 1 license required for every 2 physical processors | 1 license required for every 2 physical processors |
| Active Operating System Environments (OSEs) per license | 1 Physical + unlimited Virtual | 1 Physical + 2 Virtual* |
| Downgrade to Version | Any prior | Any prior |
| Downgrade to Edition | Type A OS and Type B OS | Type B OS |
| Other features | Full Types A and B OS functionality | Full Type B OS functionality |
| Consideration Cost | 4,809 | 882 |
| Available Quantity | 10 | 30 |

*FIG. 6*

| Physical Processor | Heaters Required | Type Two Cost (each) | Max Type One Ice for less than Type Two LE cost (each) | Max VMs using Type Two LE less than Type One LE cost | Cost of Type Two LE with Max VMs | Optimization Ratio Threshold |
|---|---|---|---|---|---|---|
| 1 | 1 | 4,809 | 5 | 10 | 4,410 | 5.0 |
| 2 | 1 | 4,809 | 5 | 10 | 4,410 | 5.0 |
| 3 | 2 | 9,618 | 10 | 20 | 8,820 | 5.0 |
| 4 | 2 | 9,618 | 10 | 20 | 8,820 | 5.0 |

*FIG. 7*

LICENSE ENTITLEMENT ASSIGNMENT AMBIGUITY RESOLUTION

BACKGROUND

Organizations acquire the right to use electronic resources (e.g., software or hardware functions) through a complex set of electronically-enforceable agreements that provide specific terms under which the electronic resources may be used. Each agreement can grant rights to an entity account or a device to access one or more electronic resources under one or more electronically-enforceable constraints (e.g., according to the terms). A resource control system can examine and enforce these rights. For example, the electronically-enforceable agreements can be referred to as "licenses." The resource control system can also include a distribution system. The distribution system can account for consumption of individual rights (e.g., "entitlements") to one or more electronic resources. A license entitlement is a consumable representation of a key that provides access (e.g., with electronically-enforceable constraints) to an electronic resource or a set of electronic resources. The license entitlement can be "consumed" by per usage, per account, per device, per time period, or any combination thereof. When the parties (e.g., an end-user device and the distribution system) commit to the grant of an entitlement, the end-user device is said to have "consumed" the license entitlement. This can be referred to as a license consumption event.

It is common for each license consumption event to have more than one potential license entitlement that may grant the requested rights of a consumption demand request. For example, an electronically-enforceable agreement can provision the different potential license entitlements for consumption. When this ambiguity (e.g., having multiple possible variations of license entitlements to consume) exists, enterprises (e.g., potential consumers of the license entitlements) generally desire to obtain the most cost effective entitlement to accomplish the desired task associated with the desired electronic resource. This can serve to minimize the cost of utilizing the electronic resource. Due to the large number of possibilities across usage constraint types and due to frequent changes to terms of electronically-enforceable agreements, resource versions, resource variations, resource editions, agreement editions, or any combination thereof, it is often impractical for any organization or person to conduct such an optimization exercise in a reasonable amount of time. This challenge is further exacerbated by variance in usage channels (e.g., usage of resources from physical installations, remote usage with technologies such as application or desktop virtualizations, global usage rights, etc.). A typical distribution system may need to process millions of consumption demand requests and grant just as many entitlements within a short period of time. Accordingly, conventional distribution systems are unable to optimize its assignments of license entitlement in an effective manner.

SUMMARY

A resource control system can be responsible for assigning licenses to one or more computing devices or one or more user accounts on one or more computing devices. The resource control system can implement a provisioning optimization technique to resolve ambiguities in selecting license entitlements and to select the license entitlement that provides the greatest value out of the consideration spent to obtain the electronic resource. For example, the provisioning optimization technique can minimize the cost of each license consumed. Several embodiments implement an ambiguity resolution mechanism for identifying and assigning the lowest cost license entitlement to each event that results in a license being consumed, in circumstances where more than one possible license may be applied, considering the relative cost of each license entitlement that may be used to cover that license consumption event based on the product use rights (PURs) that the entitlement provides. The ambiguity resolution mechanism is extensible and can be adapted to work with new licenses, use rights, and consumption models as they are introduced Some embodiments of this disclosure have other aspects, elements, features, and steps in addition to or in place of what is described above. These potential additions and replacements are described throughout the rest of the specification

BRIEF DESCRIPTION OF THE DRAWINGS

FIG. 6 is an example of records of an ambiguity entitlement set of license entitlements, in accordance with various embodiments.

FIG. 7 is an example of a table generated as part of optimization ratio threshold calculation, in accordance with various embodiments.

Figure 1:
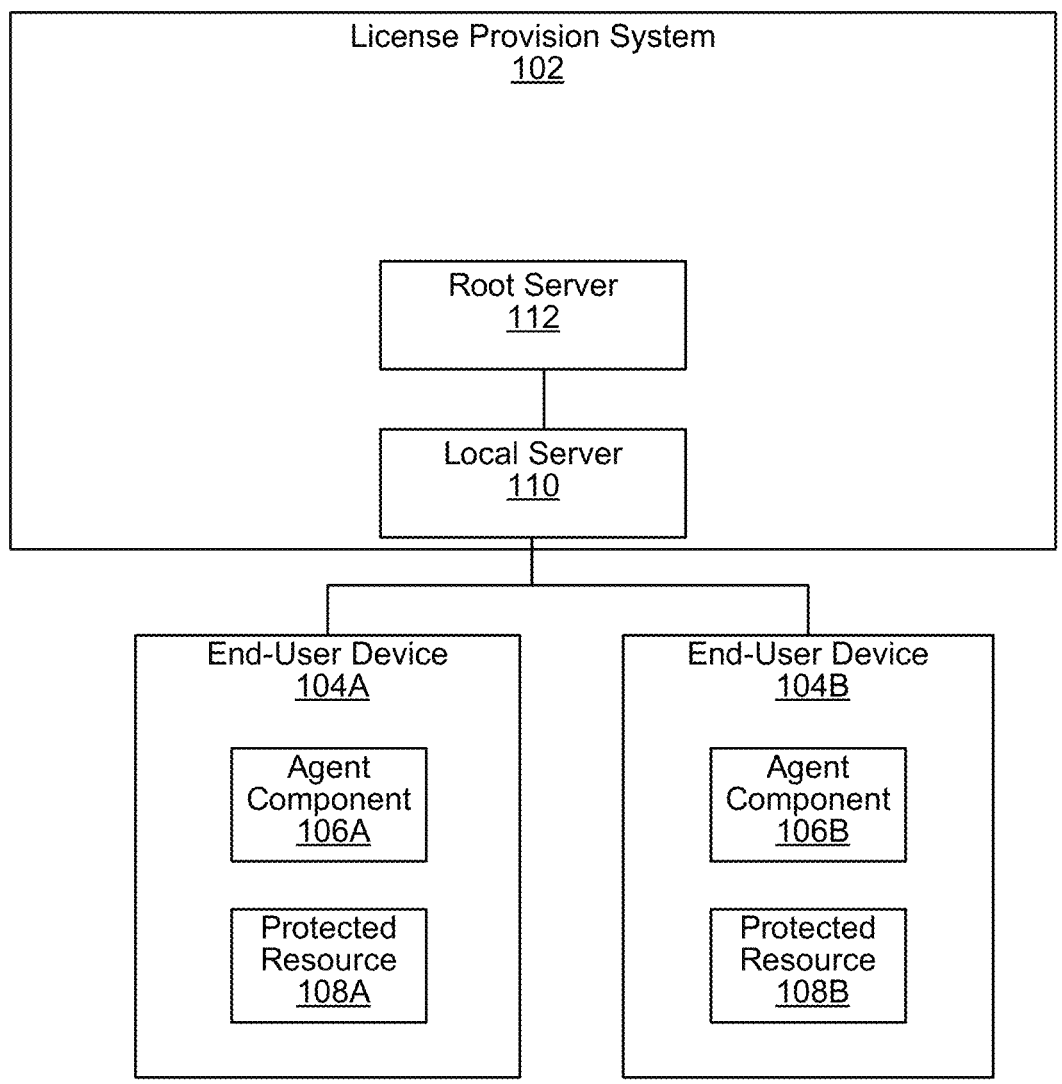
FIG. 1 is a block diagram illustrating an operating environment of a resource control system for managing access to one or more electronic resources, in accordance with various embodiments.

The figures show various embodiments of this disclosure for purposes of illustration only. One skilled in the art will readily recognize from the following discussion that alternative embodiments of the structures and methods illustrated herein may be employed without departing from the principles of embodiments described herein.

DETAILED DESCRIPTION

The terms used in this disclosure are used in accordance with the following description. A "license entitlement" (LE) refers to an object representing a right granted by a license. The license entitlement can have an available quantity. The available quantity limits how many times the license entitlement can be consumed. An organization can acquire a license entitlement a number of times from a license provision system (e.g., a software publisher or an application service platform) and reduce the available quantity of the license entitlement by that number of times. In various embodiments, acquisition of a license entitlement requires relinquishment of a consideration in exchange. The exchange of consideration can be tracked, authenticated, and verified electronically. Each license entitlement contains one or more attribute/value pairs. For example, some of the attribute/value pairs can correspond to a "license metric," "unit cost," one or more "product use rights," or any combination thereof. A resource control system can assign a license entitlement to a consumer object (e.g., an object that triggered a consumption demand request).

For ease of discussion, an assignment of a consumption demand request to a license entitlement is equivalent to an assignment of the license entitlement to the consumption demand request. Such assignment can be equivalent to the consumption of the license entitlement by the consumption demand request and/or the consumer object.

A "license metric" is a categorization of how to measure a license entitlement. When combined with the product use rights, the license metric can provide the complete method for calculating license consumption for a particular license entitlement. A license metric can also be referred to as a "license model." "Unit cost" is the cost of a single unit quantity of a license entitlement. The unit cost can be measured in any quantity metric of considerations (e.g., resources, such as some quantity of an electronic resource) that is spent in exchange for a license entitlement. A "product use right" is an attribute/value pair in a license entitlement that represents a specific term of use granted by the license entitlement. Product use rights, for example, can include allowances to deploy a number of additional copies of software on virtual machines hosted by a licensed device or allowances to deploy a number of backup or disaster recovery installations bundled with a production license entitlement.

A "license consumption event" is an individual instance of license consumption corresponding to a license entitlement that can consume a specific quantity or the entirety of the license entitlement. The license consumption event can be governed and determined by a license metric and corresponding product use rights. For example, a user license entitlement may be consumed based on users found to use licensed software (e.g., detected by a license enforcement application or other agent component of a license provision system). In another example, a device license entitlement may be consumed based on devices from which software is accessed or on which the software is running. In yet another example, a record license entitlement may be consumed based on records found in a database table that is used by or accessed by licensed software.

A "consumption demand request" is a precursor to a license consumption event. A device's attempt to utilize an electronic resource can cause a license provision system to receive a consumption demand request. Once the license provision system confirms which license entitlement is assigned to the consumption demand request, the license provision system can record this act of consumption as the license consumption event.

An "ambiguity set" is a set of multiple license entitlements that can potentially be assigned to a single consumption demand request, which can mature into a single license consumption event. In some embodiments, a resource control system analyzes all available license entitlements to identify one or more ambiguity sets in an entitlement reservoir prior to receiving any consumption demand request. In some embodiments, a resource control system identifies an ambiguity in response to determining that there is an ambiguity associated with a consumption demand request. The consideration costs of the license entitlements in the ambiguity set may be different. License metrics and/or product use rights may be different as well. Identifying and assigning the lowest cost license entitlement within the ambiguity set to a single consumption demand request is the objective of the disclosed ambiguity resolution mechanism.

An "optimization ratio" is the relative efficiency of one consumption demand request compared to another consumption demand request in terms of their product use rights. The optimization ratio of a consumption demand request can measure how well the consumption demand request makes use of the available product use rights in a given license entitlement. A resource control system can generate an optimization ratio for each consumption demand request (e.g., precursors to corresponding license consumption events that they can mature into) that matches multiple license entitlements (e.g., that has an ambiguity) in each ambiguity set. In some embodiments, product use rights are quantified. In these embodiments, the optimization ratios are calculated as ratios of the quantified product use rights demanded by the consumption demand requests. For example, within a group of consumption demand requests, the optimization ratios of the respective consumption demand requests can be measured relative to a consumption demand request in the group (e.g., the consumption demand request that demands the least or the most amount of the quantified product use rights).

An "optimization ratio threshold" (ORT) is the relative cost of one license entitlement compared to another license entitlement in terms of product use rights. A resource control system can compute a unique ORT value between each pair of license entitlements in each ambiguity set. For example, when comparing License Entitlements A and B, the optimization ratio threshold is the point at which one of the License Entitlement becomes less cost effective than the other (e.g., provides the same product usage rights for the same consideration cost). If the optimization ratio is above this threshold, one of the license entitlements (e.g., License Entitlement A) is preferred because it is the more cost effective license entitlement to use. Below this threshold, the other license entitlement (e.g., License Entitlement B) is preferred because it is the more cost effective license entitlement to apply to the consumption demand request.

For example, calculating the ORT can involve calculating the number of licenses required for different types of license entitlement types (e.g., across a number of possible configurations), calculating the cost (e.g., unit cost of a license multiplied by quantitied) of each of those license entitlement types for those configurations, then calculating the threshold at which the cost curves of the different configurations cross and one of the license entitlement types becomes more expensive than the other for those configurations. The ORT can be represented as the number of units immediately prior to the point where the cost curves cross, divided by the number of units required for that configuration.

Referring now to the figures, FIG. 1 is a block diagram illustrating an operating environment of a resource control system 100 for managing access to one or more electronic resources, in accordance with various embodiments. The resource control system 100 can be implemented to manage access to electronic resources. The resource control system 100 can include a license provision system 102 and one or more end-user devices (e.g., an end-user device 104A, an end-user device 104B, etc., collectively as the "end-user devices 104"). The license provision system 102 can be responsible for assigning license entitlements to consumption demand requests generated responsive to attempts by the end-user devices 104 to access an electronic resource protected by the resource control system 100.

At least some of the end-user devices 104 can implement an agent component (e.g., an agent component 106A, an agent component 106B, etc., collectively as the "agent components 106"). For example, the agent components 106 can be agent applications or hardware components at least partially controlled or managed by the license provision system 102) to facilitate the enforcement of resource control agreements. The agent components 106 can enforce electronically-enforceable agreements associated with license entitlements on the end-user devices 104. For example, the agent components 106 can restrict access to protected resources (e.g., protected resource 108A, protected resource 108B, etc., collectively as the "protected resources 108") unless a device or an account verifies a license consumption event executed on its behalf.

The license provision system 102 can include devices (e.g., a local server 110) in a local network of the end-user devices 104 or in an external network of the end-user devices 104. The license provision system 102 can also include a root server 112 that validates all license consumption events managed by the license provision system 102. In various embodiments, the end-user devices 104 can be on different local networks.

Each software license purchased by an organization can be represented by a license entitlement. A license entitlement can contain one or more attribute/value pairs, including unit cost, a license metric, and various product use rights. The scale of a typical organization trying to optimize the application of software licenses can involve hundreds of thousands of endpoints and hundreds of thousands of users and other objects, each of which can trigger a license consumption event. Further, the typical IT environment is constantly changing; tens, hundreds, or even thousands of machines are created and retired every day. For an ambiguity resolution mechanism to be effective at this scale, the ambiguity resolution mechanism has to complete in a short timeframe (e.g., a few hours or less) under demanding environments. In some embodiments, a resource consumption event is recorded on a host computer. In some embodiments, a resource consumption event is linked to users, records in a table, or devices or apparatuses physically deployed in a location monitored by the resource control system 100. In various embodiments, the ambiguity resolution mechanism implements a single pass algorithm that processes sorted lists of optimization ratios. In layman's terms, sets of licenses are compared to each other to identify the circumstances under which one or the other is the most cost effective choice, they are ranked accordingly, and consumed as needed when corresponding consumption events are found.

Figure 2:
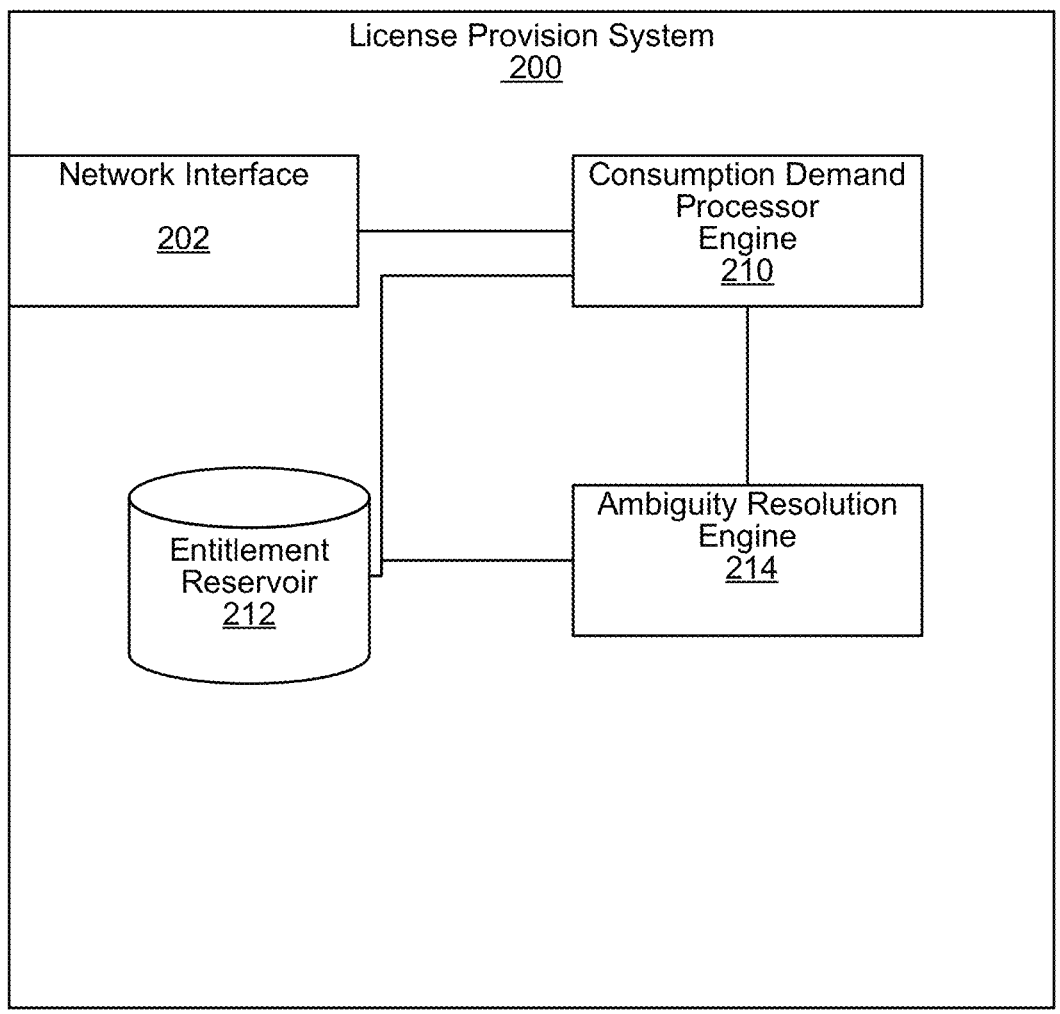
FIG. 2 is a block diagram illustrating functional components of a license provision system, in accordance with various embodiments.

FIG. 2 is a block diagram illustrating functional components of a license provision system 200 (e.g., the license provision system 102), in accordance with various embodiments. The license provision system 200 can include a network interface 202. For example, the network interface 202 can be an agent application programming interface (API) configured to communicate with at least one of the agent components 106 of an end-user device (e.g., one of the end-user devices 104).

The license provision system 200 can include a consumption demand processor engine 210, an entitlement reservoir 212, and an ambiguity resolution engine 214. The consumption demand processor engine 210 is configured to communicate with external devices in regard to the consumption of license entitlements. For example, the consumption demand processor engine 210 can receive a consumption demand request from an end-user device or a subsidiary distribution server. The consumption demand processor engine 210 can select a license entitlement available in the entitlement reservoir 212 to satisfy the consumption demand request. The consumption demand processor engine 210 can update the entitlement reservoir 212 after finalizing the consumption demand request into a license consumption event.

The entitlement reservoir 212 is configured to store records associated with license entitlements managed by the license provision system 200. The entitlement reservoir 212 can include attribute/value pairs associated with each license entitlement, including available quantity, license metrics and/or product use rights associated with each license entitlement.

The ambiguity resolution engine 214 is configured to determine which license entitlement to select in response to the consumption demand processor engine 210 receiving a consumption demand request that can be satisfied by different license entitlements or different sets of license entitlements. In some embodiments, the ambiguity resolution engine 214 can detect one or more ambiguity sets in the entitlement reservoir 212 and update the ORTs associated with license entitlements in the ambiguity sets. In these embodiments, the license provision system 200 detect the ambiguity sets periodically, responsive to updates to the entitlement reservoir 212, and/or responsive to detecting a consumption demand request can be satisfied by multiple license entitlements. In some embodiments, the entitlement reservoir 212 can store the ORTs associated with the license entitlements in the ambiguity sets.

Functional components (e.g., circuits, devices, engines, modules, and data storages, etc.) associated with the resource control system 100, the license provision system 200, and/or other devices in the operating environment of a license provision system, can be implemented as a combination of circuitry, firmware, software, or other functional instructions. For example, the functional components can be implemented in the form of special-purpose circuitry, in the form of one or more appropriately programmed processors, a single board chip, a field programmable gate array, a network-capable computing device, a virtual machine, a cloud computing environment, or any combination thereof. For example, the functional components described can be implemented as instructions on a tangible storage memory capable of being executed by a processor or other integrated circuit chip. The tangible storage memory may be volatile or non-volatile memory. In some embodiments, the volatile memory may be considered "non-transitory" in the sense that it is not a transitory signal. Memory space and storages described in the figures can be implemented with the tangible storage memory as well, including volatile or non-volatile memory.

Each of the functional components may operate individually and independently of other functional components. Some or all of the functional components may be executed on the same host device or on separate devices. The separate devices can be coupled through one or more communication channels (e.g., wireless or wired channel) to coordinate their operations. Some or all of the functional components may be combined as one component. A single functional component may be divided into sub-components, each sub-component performing separate method step or method steps of the single component.

In some embodiments, at least some of the functional components share access to a memory space. For example, one functional component may access data accessed by or transformed by another functional component. The functional components may be considered "coupled" to one another if they share a physical connection or a virtual connection, directly or indirectly, allowing data accessed or modified by one functional component to be accessed in another functional component. In some embodiments, at least some of the functional components can be upgraded or modified remotely (e.g., by reconfiguring executable instructions that implements a portion of the functional components). The systems, engines, or devices described may include additional, fewer, or different functional components for various applications.

Figure 3:
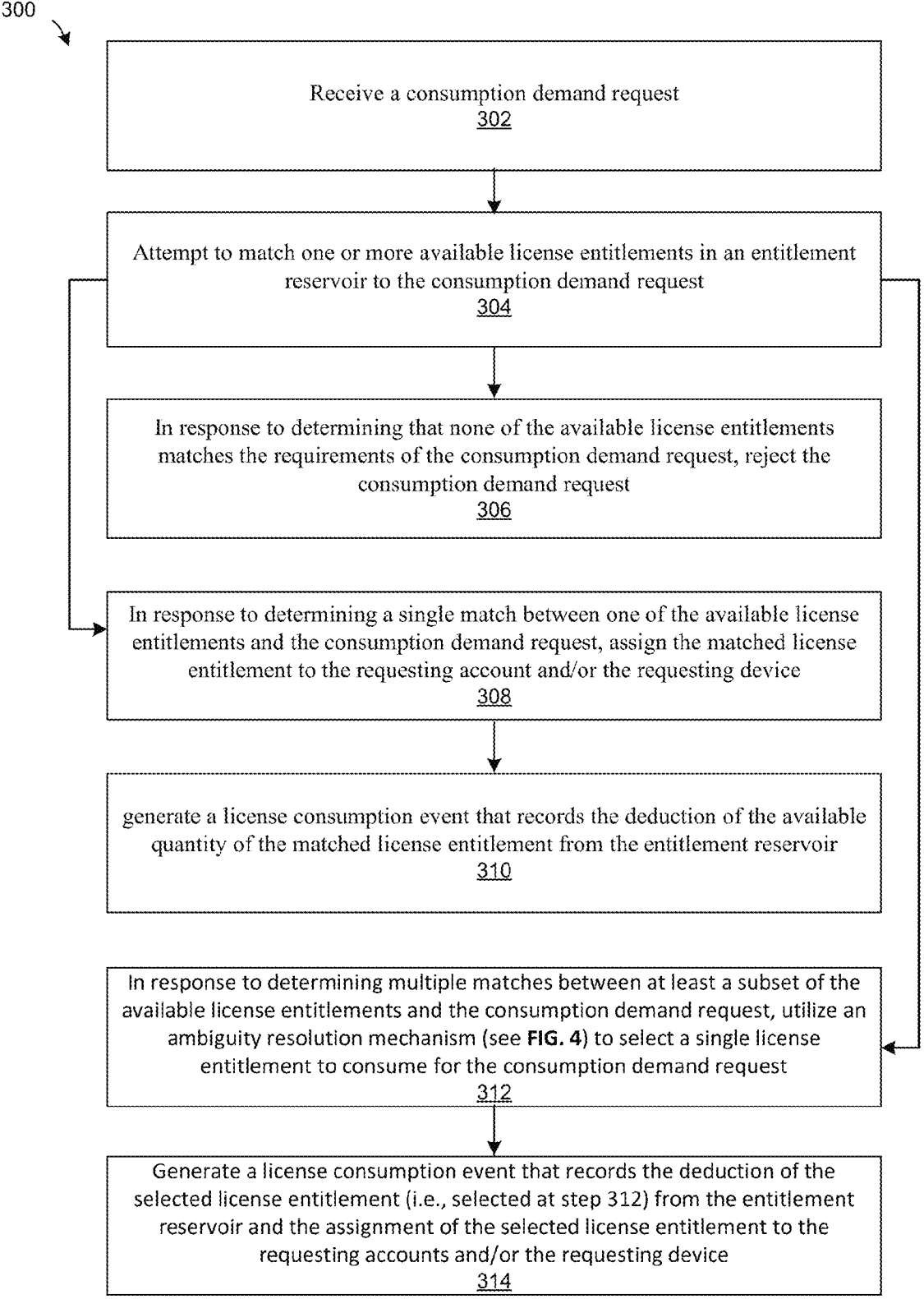
FIG. 3 is a flowchart illustrating a method of operating a license provision system to respond to a consumption demand request, in accordance with various embodiments.

FIG. 3 is a flowchart illustrating a method 300 of operating a license provision system (e.g., the license provision system 102 and/or the license provision system 200) to respond to a consumption demand request, in accordance with various embodiments. Although for convenience of reading, the steps of the method 300 are stated as being performed by the license provision system, in some embodiments, a computing device implementing an agent component (e.g., one of the agent components 106) of the license provision system can perform at least a portion of the method 300.

At step 302, the license provision system receives a consumption demand request. The consumption demand request can specify one or more target electronic resources to consume/access and/or one or more requirements (e.g., usage requirements, functionality requirements, user account requirements, or any combination thereof) associated with usage of the target electronic resources. The consumption demand request can be triggered by a requesting account attempting to utilize the target electronic resources. For example, an agent component in an end-user device can generate the consumption demand request in response to a requesting account attempting to access the target electronic resources. The requesting device can be an end-user device or a subsidiary distribution server. The requesting account can be an entity account (e.g., representing a single user, a group of users, or an organization) identifiable by the license provision system.

At step 304, the license provision system attempts to match one or more available license entitlements (e.g., with positive available quantity) in its entitlement reservoir (e.g., the entitlement reservoir 212) to the consumption demand request. For example, the license provision system can match the associated electronic resources of the license entitlements against the requested target electronic resources of the consumption demand request. The license provision system can also match the product usage rights of the license entitlements against the requested requirements.

For example, the matching process can include the license provision system determining electronic resources (e.g., software installations or hardware components) available for consumption in the requesting device. The license provision system can also identify other license consumption events recording available quantities of the license entitlements already consumed by the requesting entity and/or the requesting device (e.g., there may be a usage limitation per account or device). Based on the consumed available quantities, the license provision system can identify available license entitlements from an entitlement reservoir maintained by the license provision system and/or its affiliated devices.

In response to determining that none of the available license entitlements matches the requirements of the consumption demand request, at step 306, the license provision system can reject the consumption demand request. In response to determining a single match between one of the available license entitlements and the consumption demand request, at step 308, the license provision system can assign the matched license entitlement to the requesting account and/or the requesting device. At step 310, in response to the assignment at step 308, the license provision system can generate a license consumption event that records the deduction of the available quantity of the matched license entitlement from the entitlement reservoir.

In response to determining multiple matches between at least a subset of the available license entitlements and the consumption demand request, at step 312, the license provision system can utilize an ambiguity resolution mechanism (see FIG. 4) to select a single license entitlement to consume for the consumption demand request. At step 314, the license provision system can generate a license consumption event that records the deduction of the selected license entitlement (i.e., selected at step 312) from the entitlement reservoir and the assignment of the selected license entitlement to the requesting accounts and/or the requesting device.

In some embodiments, the various cases represented by steps 306, 308, and 312 can be performed in parallel. In other embodiments, the various cases represented by steps 306, 308, and 312 can be sequentially performed.

Figure 4:
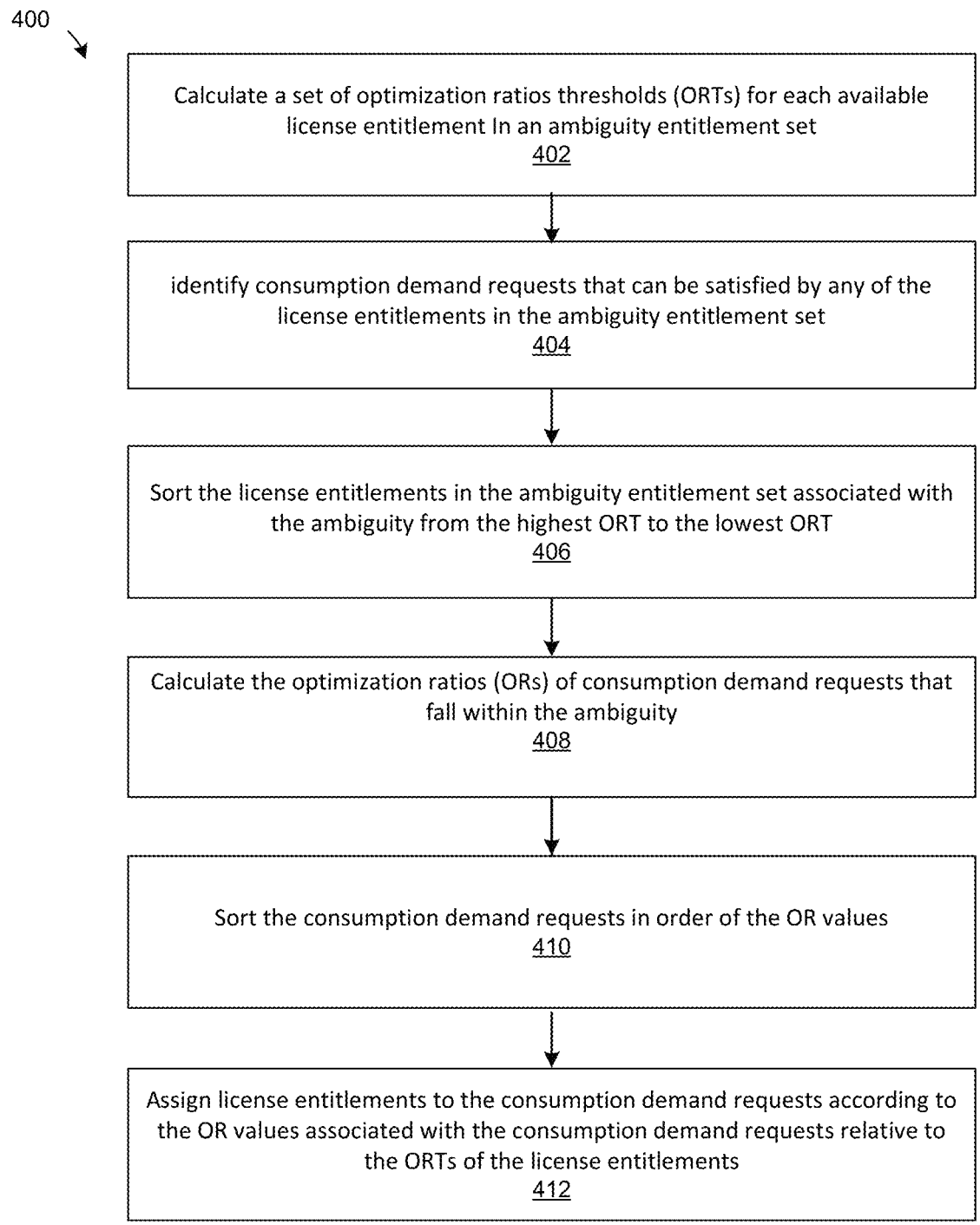
FIG. 4 is a flowchart illustrating a method of implementing an ambiguity resolution mechanism for a license provision system, in accordance with various embodiments.

FIG. 4 is a flowchart illustrating a method 400 of implementing an ambiguity resolution mechanism for a license provision system (e.g., the license provision system 102 and/or the license provision system 200), in accordance with various embodiments. Although for convenience of reading, the steps of the method 400 are stated as being performed by the license provision system, in some embodiments, an agent component of the license provision system in a computing device can perform at least a portion of the method 400. In various embodiments, the method 400 can be an expansion of step 312 of the method 300. The method 400 enables the license provision system or an agent of the license provision system to select an available license entitlement when there is ambiguity associated with a consumption demand request. The method 400 can ensure that the selected available license entitlement is the most cost effective match from an entitlement reservoir maintained by the license provision system.

At step 402, the license provision system can calculate a set of optimization ratios thresholds (ORTs) for each available license entitlement associated with the ambiguity entitlement set. For example, the license provision system can compare each available license entitlement to each other license entitlement in the target set. In one example, the license provision system can generate a table containing different variables associated with the target set of available license entitlements. The table can include product use rights of the available license entitlements. The product use rights can vary between each license entitlement available in the target set. The rows of the table can represent different combinations of these variables and the resulting costs (e.g., consideration required to be spent in exchange to consume a license entitlement) of using each license entitlements to satisfy the consumption demand request.

The license provision system can pre-calculate optimization ratio thresholds between pairs of available license entitlements in an entitlement reservoir (e.g., the entitlement reservoir 212). For example, the license provision system or an agent thereof can calculate these ORT values.

In one example, the consumption demand request can be directed to consuming a processor-based license. That is, the consumption demand request can correspond to utilizing a certain number of processors in an operating environment (e.g., a physical or a virtual operating environment implemented by the requesting device or one or more other devices). The generated table can include at least one record per potential number of processors, up to the maximum number of processors found in the operating environment. If different license entitlements in the target set of different limitation on the number of virtual machines allowed, the generated table can also include another column specifying a limit on the number of virtual machines allowed per license entitlement.

At step 404, the license provision system can identify consumption demand requests that can be satisfied by any of the license entitlements in the ambiguity entitlement set. For example, a software application can be installed on a device and the terms of a set of license entitlements require that installations be licensed. In at least some examples, when an end-user attempts to utilize an application installed on the device, the license provision system receive a consumption demand request. The license provision system can attempt to match the target application to corresponding license entitlements covering the same target application. In cases where there are multiple license entitlements covering the same target application, the license provision system can identify that situation as an "ambiguity" associated with the consumption demand request. In various embodiments, the license provision system can identify a target set of one or more available license entitlements (e.g., license entitlements with available quantities that are positive) in the entitlement reservoir matching the consumption demand request as the "ambiguity set".

At step 406, the license provision system can sort the license entitlements in the target set associated with the ambiguity set from the highest ORT to the lowest ORT. In various embodiments, the disclosed method 400 can resolve an ambiguity set associated with a single ambiguity at a time. In some embodiments, the disclosed method 400 can be repeated as necessary as other ambiguities are found. At step 408, the license provision system can calculate optimization ratios (ORs) that fall within the ambiguity, including for example, the consumption demand request received at step 302. The license provision system can handle multiple consumption demand requests that can mature into a license consumption events. In response to detecting an ambiguity associated with a consumption demand request, the license provision system can calculate OR values at step 408. At step 410, the license provision system can sort the consumption demand requests in order of the OR values (e.g., from highest to lowest).

At step 412, the license provision system can assign license entitlements to the consumption demand requests according to the OR values associated with the consumption demand requests relative to the ORTs of the license entitlements. The license provision system can execute the method 500 to make assignments of all of the pending consumption demand requests based on the ORT values and the OR values.

Figure 5:
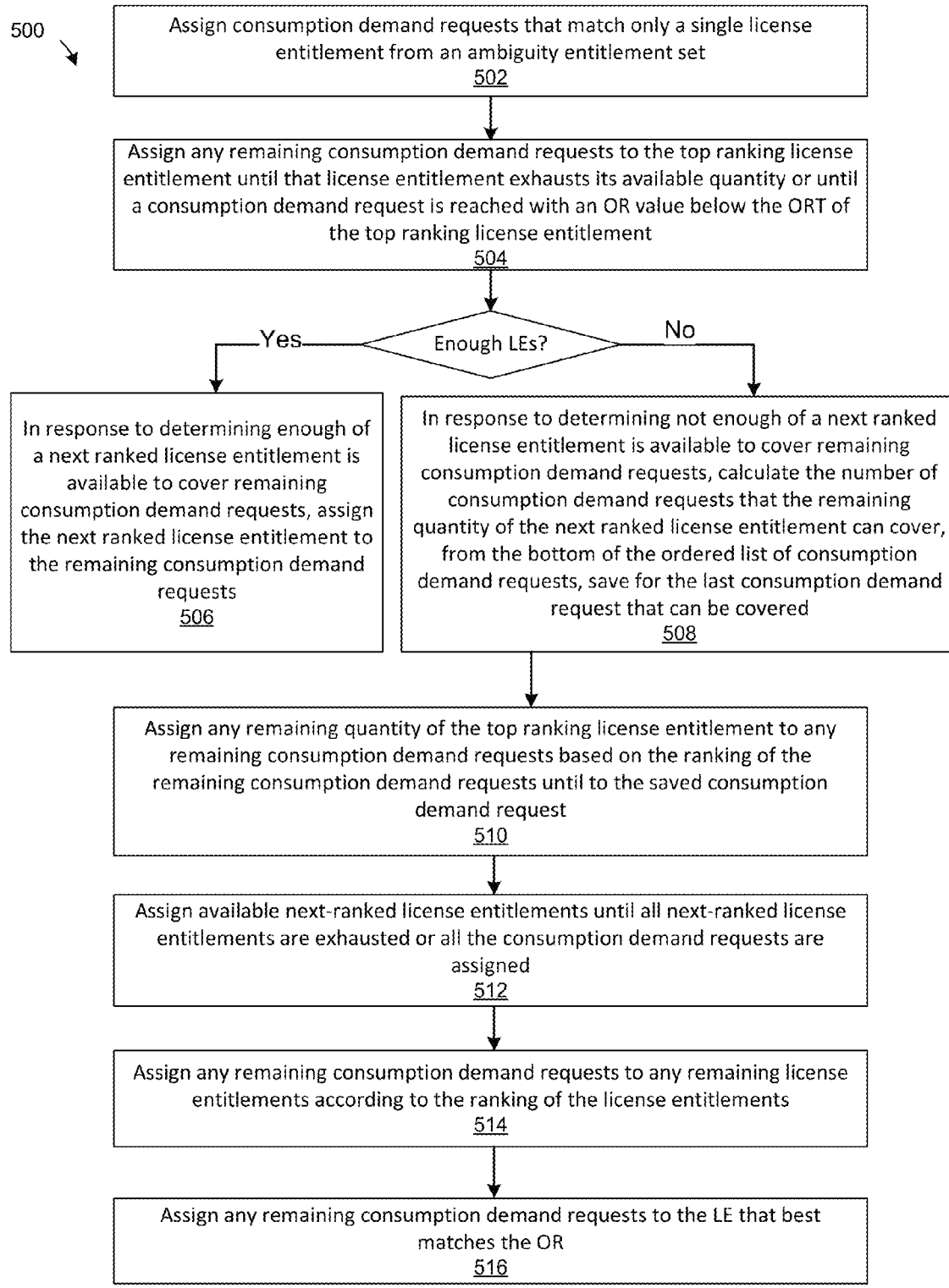
FIG. 5 is a flowchart illustrating a method for assigning license entitlements to consumption demand requests according to the ambiguity resolution mechanism, in accordance with various embodiments.

FIG. 5 is a flowchart illustrating a method 500 for assigning license entitlements to consumption demand requests according to the ambiguity resolution mechanism, in accordance with various embodiments. The method 500 can be performed by a license provision system (e.g., the license provision system 102 and/or the license provision system 200) or an agent of the license provision system. In some embodiments, an agent component (e.g., an agent application or a hardware component) of the license provision system in a computing device can perform at least a portion of the method 500. In these embodiments, for convenience of reading, the steps of the method 300 are stated as being performed by the license provision system. In various embodiments, the method 500 can be an expansion of step 412 of the method 400.

At step 502, the license provision system can assign consumption demand requests that match only a single license entitlement from an ambiguity entitlement set. For example, the license provision system can assign consumption demand requests that specify a use requirement that can only be satisfied by one of the license entitlements in the ambiguity entitlement set. In this example, these consumption demand requests get priority to be assigned to the single license entitlement that can satisfy the usage requirement. In some cases, some consumption demand requests are only able to match certain license entitlements based on the characteristics/product use rights of these license entitlements licenses.

In at least one example, an end-user device's use of a particular electronic resource (e.g., a target application) can trigger a consumption demand request. An ambiguity entitlement set may include multiple license entitlements. Each license entitlement can have slightly different sets of electronic resources that would trigger a license consumption event. The particular electronic resource can be amongst these electronic resources. If the particular electronic resource is only exposed via a single available license entitlement, then any consumption demand requests triggered by the use of that particular electronic resource can be assigned to the single available license entitlement first. In some embodiments, the license provision system prioritizes assignment of these license entitlements.

For example, two license entitlements may be in an ambiguity entitlement set. Each license entitlement may have mostly different sets of electronic resources to which they can expose access thereto. However, overlapping available electronic resources can cause the two license entitlements to be part of the ambiguity entitle set. The license provision system can assign the consumption demand requests that have usage constraints corresponding to specific characteristics of the two license entitlements.

In some embodiments, if a set of pending consumption demand requests can only be fulfilled by a specific license entitlement, and the specific license entitlement is completely consumed by only a subset of the pending consumption demand requests, then the remaining consumption demand requests matching the now exhausted license entitlement are also assigned to that license entitlement. By assigning consumption demand requests to an already exhausted license entitlement, the consumption of that license entitlement would be greater than the available quantity of the license entitlement. This creates exceptions that are handled by the license provision system. According to the method 500, the license provision system can later re-assigned the consumption demand requests to other license entitlements that remain. Each exception cannot be assigned to their optimal license entitlement on the first pass.

When overall there are not enough licenses to cover the demand, the license provision system can assign the license entitlements from the top of the ordered list down until exhausted, regardless of the ORTs. As with the rest of the algorithm, the license provision system can assign them in order of rank as well, e.g., use the most expensive and "powerful" (broadest scope of product use rights) licenses for the most appropriate consumption demand events.

At step 504, the license provision system can assign any remaining consumption demand requests (e.g., not assigned in step 502) to the top ranking license entitlement until that license entitlement exhausts its available quantity or until a consumption demand request is reached with an OR value below the ORT of the top ranking license entitlement. The license provision system can iterate through the pending consumption demand requests according to their OR values, from highest and down. An OR value corresponding to a consumption demand request can specify how optimized the demanded usage is. The OR value can be compared against the ORTs of the available license entitlements to determine the best match. Once an assignment for a consumption demand request is made, the consumption demand request is removed from the sorted list and matures into a license consumption event.

At step 506, in response to determining that a next ranked license entitlement (i.e., a license entitlement with a ranking/ORT just below that of the top ranking license entitlement of step 504) has sufficient available quantity to cover the remaining consumption demand requests, the license provision system can assign the next ranked license entitlement to the remaining consumption demand requests (e.g., consumption demand requests not assigned in steps 504 and 506). In this scenario, the license provision system prevents applying the top ranking license entitlement because the ORT (e.g., threshold) has been reached where it no longer is optimal. Accordingly, the license provision system applies the lower ranked license entitlement and save the remaining top ranking license entitlements for the possibility that the license provision system runs out of lower ranking entitlements and need something to cover that consumption demand request.

At step 508, in response to determining that the next ranked license entitlement does not have enough available quantity to cover the remaining consumption demand requests to the next ORT, the license provision system can calculate (e.g., using the License Metric and Product Use Rights of the next ranked license entitlement) the number of consumption demand requests that the remaining quantity of the remaining total license entitlements can cover, from the bottom of the ordered list of consumption demand requests and up (e.g., consumption demand requests with lowest OR values and up). In this step, the license provision system can use the least amount of higher ranked licenses possible. The license provision system can use the most appropriate license for the OR bands as much as possible, and only using less optimal licenses as needed to fill in any gaps. By calculating from the bottom of the entire stack up, the license provision system can ensure that lower ranked license entitlements are preferred for lower ORT bands. An ORT band of consumption demand requests include one or more consumption demand requests with OR values between ORT values of next ranking license entitlements. Only if there are not enough lower ranked license entitlements to cover the remaining consumption demand requests would the license provision system use the excess higher ranked license entitlements from the reservoir. In some cases, the license provision system can mark or save the last consumption demand request that can be properly licensed by an available next-ranked LE. In some cases, it is not necessary to mark or save this, since the last consumption demand request is simply the next consumption demand request in the list that does not yet have a license assigned.

In some embodiments, an ambiguity set only has two license entitlements. In other embodiments, an ambiguity set has three or more license entitlements. In these embodiments, the license provision system can, in step 508, (and similar steps that calculate the best way to fill the "gap") calculate the gap across the entire ambiguity set of remaining consumption demand requests, not just the ones to the next ORT on the ordered list.

At step 510, the license provision system can assign any remaining top ranking license entitlement (e.g., highest ranking license entitlement that has a positive availability quantity) to any remaining consumption demand requests based on the ranking of the remaining consumption demand requests (e.g., from the top unassigned consumption demand request and down) until to the saved consumption demand request from step 508. For example, in an ambiguity set of three license entitlement types and the top two license entitlement types can both have excess licenses in the reservoir (i.e., positive available quantity) after filling their bands, but the bottom license entitlement type needs more licenses (i.e., needs to replenish its available quantity), then license provision system uses the spare licenses from the middle ranked license entitlement (e.g., the next highest ranking license entitlement than the one currently being evaluated and/or the lowest ranking license entitlement with available quantity after that has been used for previous consumption demand requests), and not the top ranked license. This enables the license provision system to achieve the best result by saving the highest possible number of highest ranked licenses.

At step 512, the license provision system can assign available next-ranked license entitlements until all next-ranked license entitlements are exhausted or all the consumption demand requests are licensed.

At step 514, the license provision system can assign any remaining consumption demand requests to any remaining license entitlements according to the ranking of the license entitlements. The license provision system can generate an alert to the requesting user corresponding to the consumption demand requests that these consumption demand requests are not assigned to the optimal license entitlement. The license provision system can generate an alert to inform the requesting user that these consumption demand requests are assigned to their respective license entitlements because of the limited availability of license entitlements remaining at the time. The assignment of these consumption demand requests enables the license provision system to make assignments without having to purchase additional license entitlements.

Any remaining consumption demand requests at this point represent a negative gap of available license entitlements compared to consumption demand requests. In these cases, the license provision system have to request additional license entitlements from a vendor's system (e.g., the vendor for the license entitlements in the ambiguity set). At step 516, the license provision system can assign the remaining consumption demand requests to the license entitlements that best match their corresponding optimization ratio. For example, if the optimization ratio for a consumption demand request is above the optimization ratio threshold of the top ranked license entitlement, then the license provision system assign the consumption demand request to the top ranked license entitlement (e.g., with the highest ORT). However, if the OR of the consumption demand request is below the ORT of the top ranked license entitlement, then the license provision system assign the consumption demand request to the next ranked license entitlement.

At this point, all consumption demand requests should be assigned to a license entitlement, even if that resulted in an assignment to a license entitlement with a non-positive available quantity. The consumption demand requests that have been assigned to the license entitlements can be used to generate a report. The report can identify one or more consumption demand requests assigned to the license entitlements in the ambiguity set. If the associated license entitlements have a positive available quantity, the license provision system records the consumption of the license entitlements by the corresponding consumption demand requests. The report can also indicate which consumption demand requests have been assigned an optimal (e.g., cost-optimal) license entitlement, and which consumption demand requests have been assigned a non-optimal license entitlement.

Figure 9:
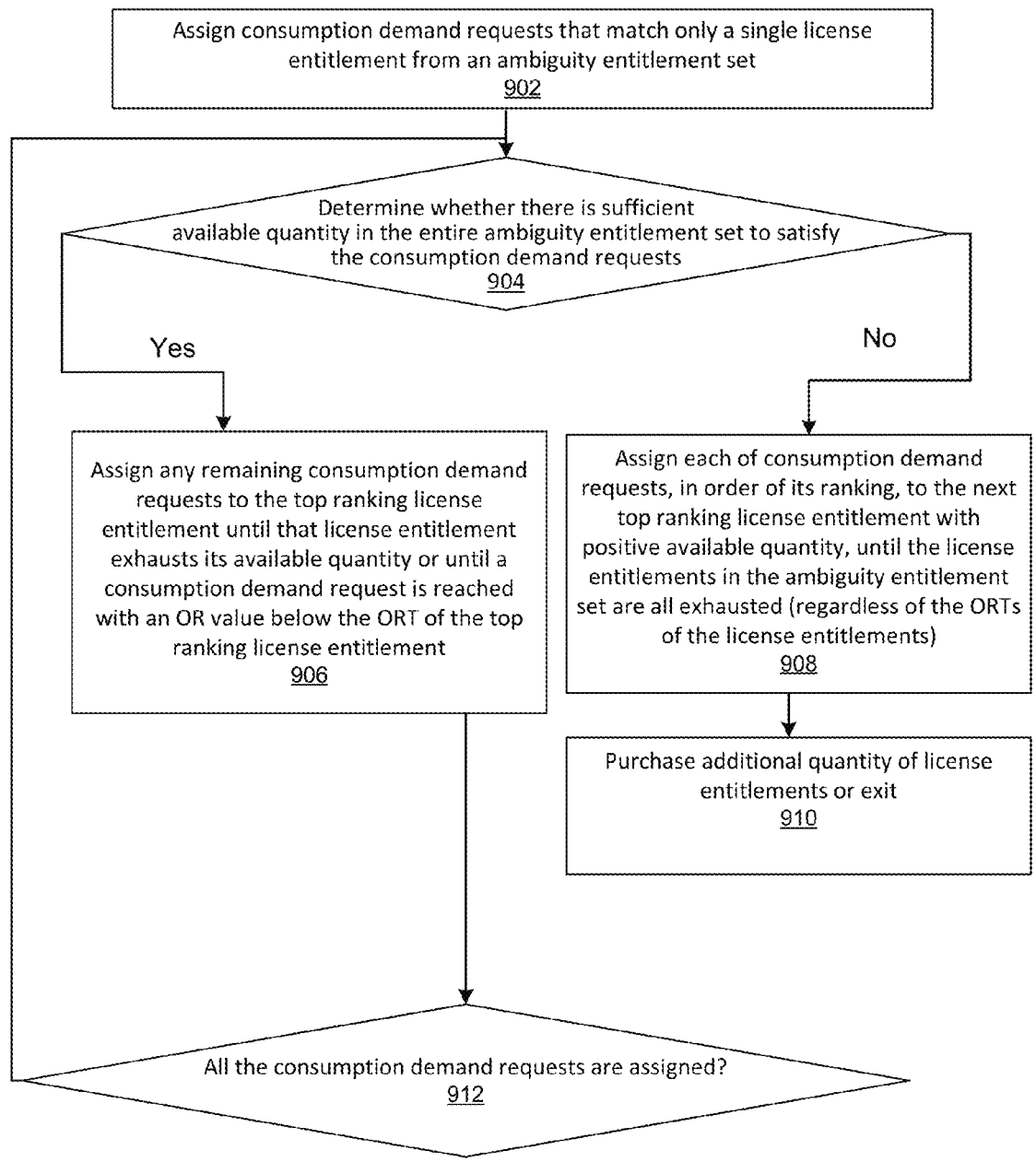
FIG. 9 is a flowchart illustrating an alternative method for assigning license entitlements to consumption demand requests according to the ambiguity resolution mechanism, in accordance with various embodiments.

FIG. 9 is a flowchart illustrating an alternative method 900 for assigning license entitlements to consumption demand requests according to the ambiguity resolution mechanism, in accordance with various embodiments. The method 900 can be an alternative embodiment to the method 500. At step 902, a license provision system can assign consumption demand requests that match only a single license entitlement from an ambiguity entitlement set (e.g., a set of license entitlement types that overlap in product use rights).

At step 904, the license provision system can determine whether there is sufficient available quantity in the entire ambiguity entitlement set to satisfy the consumption demand requests. If there is sufficient available quantity, the license provision system, at step 906, assigns any remaining consumption demand requests to the top ranking license entitlement (e.g., in the ambiguity entitlement set) with positive available quantity until the license entitlement exhausts its available quantity or until a consumption demand request is reached with an OR value below the ORT of the top ranking license entitlement.

If there is not sufficient available quantity, the license provision system, at step 908, assigns each of the consumption demand requests, in order of its ranking, to the next top ranking license entitlement with positive available quantity, until the license entitlements in the ambiguity entitlement set are all exhausted. Performance of step 908 can be regardless of the ORTs of the license entitlements. If all license entitlements in the ambiguity entitlement set are exhausted (no available quantity left), the license provision system can proceed to step 910. At step 910, when all license entitlements are exhausted, the license provision system can purchase additional quantity of license entitlements or exit the method 900.

At step 912, the license provision system can determine whether all of the consumption demand requests are assigned. If not all of the consumption demand requests are assigned, the license provision system can iterate through steps 904 and 906. When iterating through steps 904 and 906, if a previous iteration of step 906 stops when a consumption demand request is reached with an OR value below the ORT of the top ranking license entitlement, the license provision system can iterate through steps 904 and 906 again with a next-top-ranking license entitlement as the "top ranking license entitlement" at the later iteration of step 906.

In essence, the overall process of steps 904 and 906 can repeat for every ORT band, evaluating if there are enough remaining quantity of license entitlements that are "best suited" for the lower bands. If there are, then the license provision system keep these spare quantity in reserve and continue. If the license provision system do have enough quantity of license entitlements, then the license provision system calculate how many from the current ORT band is needed, use those, and then leave whatever remains in reserve.

While processes or blocks are presented in a given order in this disclosure, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. In addition, while processes or blocks are at times shown as being performed in series, these processes or blocks may instead be performed in parallel, or may be performed at different times. When a process or step is "based on" a value or a computation, the process or step should be interpreted as based at least on that value or that computation. A process step is "in response to" to another process step when the process step is a direct reaction to the completion of the other process step.

FIG. 6 is an example of records of an ambiguity entitlement set of license entitlements, in accordance with various embodiments. This example corresponds to a license assignment process for two types of server operating systems (OS), for example, a "Type A" and a "Type B". This example also illustrates two types of license entitlements: "Type One" and "Type Two".

Between the two types of license entitlements, the key difference in the PURs is the number of virtual machines (VMs) allowed per license, which varies depending on the type. Otherwise, the PURs are quite consistent between the types. The Type A OSs are intended for large virtual machine farms, and are best applied to the host machines supporting the greatest number of virtual guests. The illustrated server OS types are accessible via processor-based license entitlements (e.g., Type One and Type Two). The types of license entitlements differ in the number of virtual machines per license entitlement. For either server OS types, operating system environments (OSEs) can include physical processors and virtual processors. An OSE is essentially a container running an operating system, whether on physical or virtual hardware. When all permitted OSEs are in use, the physical instance can only be used to host and manage the virtual OSEs, i.e., they cannot run an unrelated server workload.

A resource control system can identify the Type One and the Type Two license entitlements as part of an ambiguity set because of the "downgrade to edition rights" that allows licenses for Type A to cover Type B installations. Thus, the presence of a particular OS type does not correlate highly to the optimal license assignment for that installation: this is an ambiguity.

FIG. 7 is an example of a table generated as part of optimization ratio threshold calculation, in accordance with various embodiments. Based on the above chart of features, the goal in optimizing license assignments for a single requesting host must be to assign the license entitlement type based on the following rules. The resource control system can assign Type One LE to a consumption demand request if Type A OS is present in either the host or a VM, else the resource control system can assign the LE that will cost the least to license for that host, considering only the number of VMs in that host.

The resource control system can identify the threshold at which Type One LE becomes the more cost effective license assignment by comparing the cost of each LE against the VMs that each LE allows. When the number of VMs on a single host is large enough that the ratio of Type Two to Type One LEs needed to license all the VMs is above 5.0, Type One LE is the most cost effective license entitlement to assign. When a Type One LE is assigned to a host, its properties apply to the host and all of VMs running on the host. A single host must be licensed as either all Type One LEs or all Type Two LEs in the illustrated example. There can be no mixing of LE assignments.

The prices of the LEs can be delivered as content through a Stock Keeping Units (SKU) library (e.g., a database that keeps track of SKU associated with LEs and related metadata, such as version, edition, purchase program, maintenance status, etc.). If a requesting user (e.g., customer) adds a custom Unit Cost, that Unit Cost can be used to calculate the unique ORT for just that requesting user. In the illustrated example, the ORT is highly consistent from scenario to scenario. In some embodiments, the ORT of a LE can be stored as an algebraic equation, e.g., a step function, to account for possible shifts in the ORT from across a range of scenarios.

Multiple Hosts

Large organizations typically have a large number (e.g., hundreds, thousands, or hundreds of thousands) of hosts to consider as part of an ambiguity resolution process. In the example of FIG. 7, a "Type Two to Type One LE ratio" (hereafter referred to as the "Optimization Ratio Threshold") (ORT1) must be determined using cost per license across various host configurations and the number of VMs that can be permitted for the Type B edition without exceeding the cost of the Type A edition for that same host. If available locally, a customer-specific ORT1 should be determined based on organization set Unit Cost information. If not available, content provided Unit Cost information should be used.

All hosts with Type A or Type B OS editions should be added to a list. Each host in that list should be assigned an Optimization Ratio, and those hosts should be rank ordered from highest to lowest Optimization Ratio value. From the top down of this list, any physical installations of Type A OS edition should be assigned Type One LE. In the illustrated example, there is no LE available other than Type One LEs that can license the Type A OS edition. If there are not enough Type One LEs to cover all physical installations of the Type A OS edition, the resource control system configures the remaining hosts to each consume a Type One LE and marks the license record as in breach. If possible, the resource control system can mark those specific hosts remaining as in breach.

Continuing down the list, the resource control system assigns any hosts with virtual installations of the Type A OS edition to Type One LEs. The resource control system can move a VM from one host to another to correct a breach. The resource control system can treat reinstalling a host instance as a harder, more resource intensive problem to fix. If there are not enough Type One LEs to cover all remaining hosts with virtual installations of the Type A OS edition, the resource control system can configure the remaining hosts to each consume a Type One LE and mark the license record as in breach. If possible, the resource control system can mark those specific hosts remaining as in breach.

The resource control system can assign any remaining hosts in the list with an OR above ORT1 to the Type One LEs. These are the hosts that maximize the use of the unlimited virtualization rights of a Type One LE. The resource control system can continue the assignments until no more Type One LE apply or a host with an OR below ORT1 is reached. Once ORT1 is reached, if enough Type Two LEs remain to license all remaining hosts, the resource control system can configure all remaining hosts in list to consume Type Two LEs. If not enough Type Two LEs remain at this point, the resource control system can determine the number of hosts the available Type Two LEs can cover, from the bottom of the ordered list and up. The resource control system can save the last host that can be properly licensed by an available Type Two LE.

The resource control system can assign remaining Type One LEs to hosts in rank order down to that saved host, or until a host is reached that cannot be properly licensed with the remaining Type One LEs. From the saved host or the host that cannot be properly licensed, the resource control system can proceed down the list to assign available Type Two LEs until no more LEs remain or all hosts are assigned to an LE. The resource control system can repeat this ambiguity resolution process to cover ambiguity sets with three or more possible license entitlements.

Figure 8:
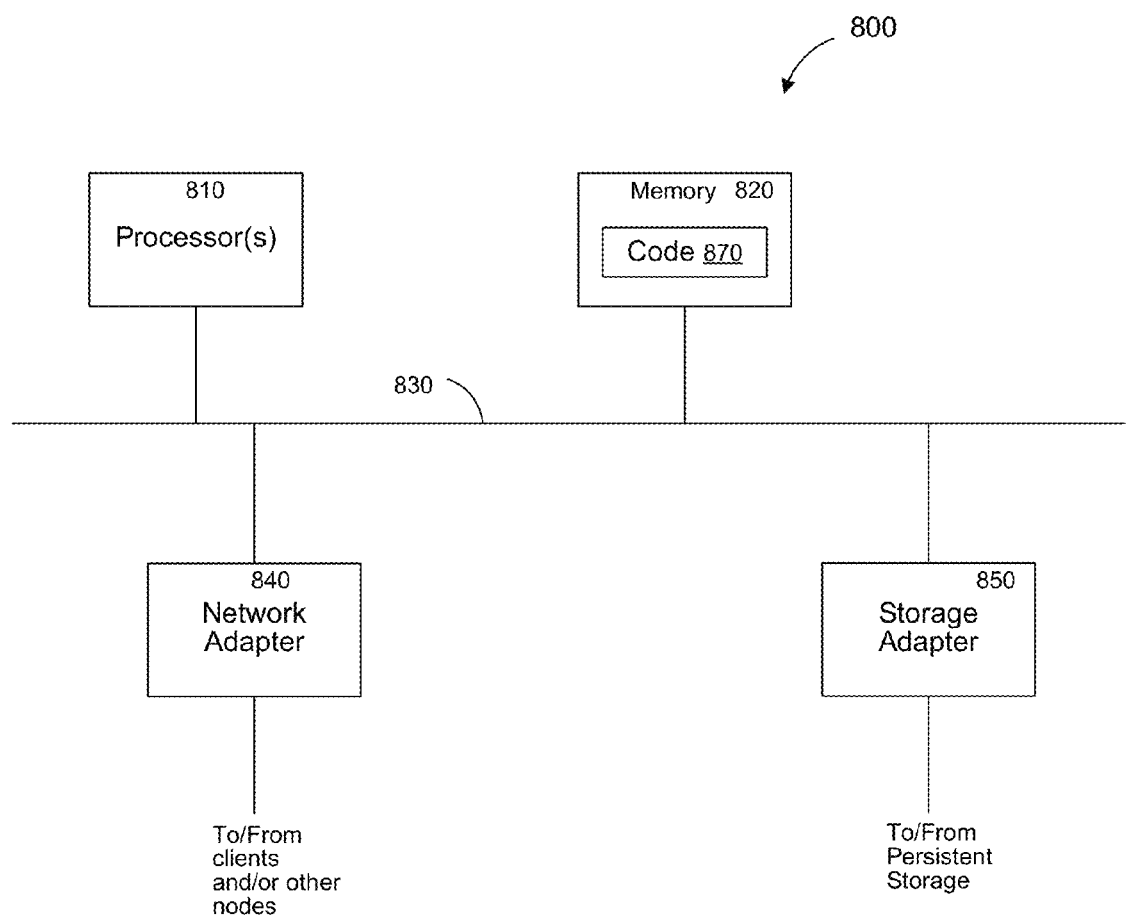
FIG. 8 is a block diagram of an example of a computing device, which may represent one or more computing device or server described herein, in accordance with various embodiments.

FIG. 8 is a block diagram of an example of a computing device 800, which may represent one or more computing device or server described herein, in accordance with various embodiments. The computing device 800 can be one or more computing devices that implement the resource control system 100 of FIG. 1. The computing device 800 can execute at least part of the methods 300, 400, and 500. The computing device 800 includes one or more processors 810 and memory 820 coupled to an interconnect 830. The interconnect 830 is an abstraction that represents any one or more separate physical buses, point-to-point connections, or both connected by appropriate bridges, adapters, or controllers. The interconnect 830, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire".

The processor(s) 810 is/are the central processing unit (CPU) of the computing device 800 and thus controls the overall operation of the computing device 800. In certain embodiments, the processor(s) 810 accomplishes this by executing software or firmware stored in memory 820. The processor(s) 810 may be, or may include, one or more programmable general-purpose or special-purpose microprocessors, digital signal processors (DSPs), programmable controllers, application specific integrated circuits (ASICs), programmable logic devices (PLDs), trusted platform modules (TPMs), or the like, or a combination of such devices.

The memory 820 is or includes the main memory of the computing device 800. The memory 820 represents any form of random access memory (RAM), read-only memory (ROM), flash memory, or the like, or a combination of such devices. In use, the memory 820 may contain a code 870 containing instructions according to the disclosed methods.

Also connected to the processor(s) 810 through the interconnect 830 are a network adapter 840 and a storage adapter 850. The network adapter 840 provides the computing device 800 with the ability to communicate with remote devices, over a network and may be, for example, an Ethernet adapter or Fibre Channel adapter. The network adapter 840 may also provide the computing device 800 with the ability to communicate with other computers. The storage adapter 850 enables the computing device 800 to access a persistent storage, and may be, for example, a Fibre Channel adapter or SCSI adapter.

The code 870 stored in memory 820 may be implemented as software and/or firmware to program the processor(s) 810 to carry out actions described above. In certain embodiments, such software or firmware may be initially provided to the computing device 800 by downloading it from a remote system through the computing device 800 (e.g., via network adapter 840).

The techniques introduced herein can be implemented by, for example, programmable circuitry (e.g., one or more microprocessors) programmed with software and/or firmware, or entirely in special-purpose hardwired circuitry, or in a combination of such forms. Special-purpose hardwired circuitry may be in the form of, for example, one or more application-specific integrated circuits (ASICs), programmable logic devices (PLDs), field-programmable gate arrays (FPGAs), etc. The term "logic," as used herein, can include, for example, programmable circuitry programmed with specific software and/or firmware, special-purpose hardwired circuitry, or a combination thereof.

Some embodiments of the disclosure have other aspects, elements, features, and steps in addition to or in place of what is described above. These potential additions and replacements are described throughout the rest of the specification. Reference in this specification to "various embodiments" or "some embodiments" means that a particular feature, structure, or characteristic described in connection with the embodiment is included in at least one embodiment of the disclosure. Alternative embodiments (e.g., referenced as "other embodiments") are not mutually exclusive of other embodiments. Moreover, various features are described which may be exhibited by some embodiments and not by others. Similarly, various requirements are described which may be requirements for some embodiments but not other embodiments. Reference in this specification to where a result of an action is "based on" another element or feature means that the result produced by the action can change depending at least on the nature of the other element or feature.

What is claimed is:

1. A computer-implemented method for resolving license assignment ambiguity in a license management computer system, comprising:
    calculating, via a hardware processor, a set of optimization ratios thresholds (ORTs) corresponding to license entitlements forming an ambiguity entitlement set, wherein each ORT is a relative cost of one license entitlement in the ambiguity set versus another license entitlement in the ambiguity set for both to have at least the same product use right;
    identifying, via the hardware processor consumption demand requests to access target electronic resources, wherein the license entitlements in the ambiguity entitlement set all grant access to the target electronic resources;
    calculating, via the hardware processor, optimization ratios (ORs) of the consumption demand requests, wherein each of the ORs is a quantified product use right ratio between that demanded by one of the consumption demand requests relative to another one of the consumption demand requests;
    sorting, via the hardware processor, the consumption demand requests into a sorted list by ordering the consumption demand request according to the ORs; and
    assigning, via the hardware processor, the license entitlements to the consumption demand requests based on comparison of the ORs of the consumption demand requests and the ORTs of the license entitlements in the ambiguity entitlement set.

2. The computer-implemented method of claim 1, further comprising sorting the license entitlements in the ambiguity entitlement set from a highest ORT to a lowest ORT.

3. The computer-implemented method of claim 1, wherein assigning the license entitlements further comprises assigning consumption demand requests that specify a use requirement that can only be satisfied by one of the license entitlements in the ambiguity entitlement set.

4. The computer-implemented method of claim 1, wherein assigning the license entitlements further comprises assigning, along to the sorted list, remaining consumption demand requests to a top ranking license entitlement according to its ORT until that top ranking license entitlement exhausts its available quantity or until a consumption demand request is reached with an OR value below the ORT of the top ranking license entitlement.

5. The computer-implemented method of claim 1, wherein assigning the license entitlements further comprises determining whether enough of a top ranking license entitlement is available to cover remaining consumption demand requests.

6. The computer-implemented method of claim 5, wherein assigning the license entitlements further comprises:
    in response to determining enough of a top ranking license entitlement, according to its ORT, is available to cover remaining consumption demand requests, assign the top ranking license entitlement to the remaining consumption demand requests.

7. The computer-implemented method of claim 5, wherein assigning the license entitlements further comprises:
    in response to determining not enough of a top ranking license entitlement is available to cover remaining consumption demand requests, assign the top ranking license entitlement to any remaining consumption demand requests based on the ranking of the remaining consumption demand requests until an available quantity of the top ranking license entitlement is exhausted.

8. The computer-implemented method of claim 7, wherein assigning the license entitlements further comprises:
    assigning available next-ranked license entitlements to remaining consumption demand requests until all next-ranked license entitlements are exhausted or all the consumption demand requests are assigned.

9. The computer-implemented method of claim 8, wherein assigning the license entitlements further comprises:
    assigning remaining consumption demand requests by:
        if a OR for a consumption demand request is above or equal to an ORT of a top available license entitlement, assigning the top available license entitlement to the consumption demand request; and
        if a OR for a consumption demand request is below an ORT of a top available license entitlement, assigning a next ranked license entitlement to the consumption demand request.

10. The computer-implemented method of claim 8, wherein assigning the license entitlements further comprises:
    assigning remaining consumption demand requests by:
        if a OR for a consumption demand request is above to an ORT of a top available license entitlement, assigning the top available license entitlement to the consumption demand request; and if a OR for a consumption demand request is below or equal to an ORT of a top available license entitlement, assigning a next ranked license entitlement to the consumption demand request.

11. A non-transitory computer readable data memory storing computer-executable instructions that, when executed by a computer system, cause the computer system to perform a computer-implemented method for resolving license assignment ambiguity in a license management computer system, the computer-executable instructions comprising:

Instructions, implemented by a hardware processor, for calculating a set of optimization ratios thresholds (ORTs) corresponding to license entitlements forming an ambiguity entitlement set, wherein each ORT is a relative cost of one license entitlement in the ambiguity set versus another license entitlement in the ambiguity set for both to have at least the same product use right;

instructions, implemented by a hardware processor, for identifying consumption demand requests to access target electronic resources, wherein the license entitlements of the ambiguity entitlement set grant access to the target electronic resources;

instructions, implemented by a hardware processor, for calculating optimization ratios (ORs) of the consumption demand requests, wherein each of the ORs is a quantified product use right ratio between that demanded by one of the consumption demand requests relative to another one of the consumption demand requests;

instructions, implemented by a hardware processor, for sorting the consumption demand requests into a sorted list by ordering the consumption demand request according to the ORs; and instructions, implemented by a hardware processor, for assigning the license entitlements to the consumption demand requests based on comparison of the ORs of the consumption demand requests and the ORTs of the license entitlements in the ambiguity entitlement set.

12. The computer readable data memory of claim 11, wherein the computer-executable instructions further comprises instructions for sorting the license entitlements in the ambiguity entitlement set from a highest ORT to a lowest ORT.

13. The computer readable data memory of claim 11, wherein the computer-executable instructions further comprises instructions for assigning consumption demand requests that specify a use requirement that can only be satisfied by one of the license entitlements in the ambiguity entitlement set.

14. The computer readable data memory of claim 11, wherein the computer-executable instructions further comprises instructions for assigning, along to the sorted list, remaining consumption demand requests to a top ranking license entitlement according to its ORT until that top ranking license entitlement exhausts its available quantity or until a consumption demand request is reached with an OR value below the ORT of the top ranking license entitlement.

15. The computer readable data memory of claim 14, wherein the computer-executable instructions further comprises instructions for, in response to determining enough of a next ranked license entitlement is available to cover remaining consumption demand requests, assigning the next ranked license entitlement to the remaining consumption demand requests.

16. A resource control system, comprising:

a computer memory storing a license entitlement reservoir configured to maintain characteristics associated with license entitlements and available quantities associated with the license entitlements;

a network interface, implemented by a hardware processor, configured to receive consumption demand requests to access one or more electronic resources;

an ambiguity resolution engine configured to calculate a set of optimization ratios thresholds (ORTs) corresponding to the license entitlements in the license entitlement reservoir that form an ambiguity entitlement set, to calculate an optimization ratio of at least two of the consumption demand requests, and to select, based on the optimization ratio compared against the ORTs, a license entitlement from the license entitlement reservoir for assignment to a consumption demand request when multiple license entitlements cover a target electronic resource specified by the consumption demand request; and a request processor engine configured to process the consumption demand requests by assigning the license entitlement to the consumption demand request according to the ambiguity resolution engine;

wherein each ORT is a relative cost of one license entitlement in the ambiguity set versus another license entitlement in the ambiguity set for both to have at least the same product use right;

wherein the optimization ratio is a quantified product use right ratio respectively between the at least two of the consumption demand requests.

17. The resource control system of claim 16, wherein the license entitlement reservoir is configured to optimization ratio thresholds corresponding to resource cost ratios between pairs of license entitlements that grant access to a same electronic resource.

18. The resource control system of claim 16, wherein the ambiguity resolution engine is configured to compute an optimization ratio associated with a consumption demand request, wherein the optimization ratio corresponds to a quantified value of resource usage efficiency of an electronic resource requested by the consumption demand request.

* * * * *